US006547226B2

(12) United States Patent
Shores et al.

(10) Patent No.: US 6,547,226 B2
(45) Date of Patent: Apr. 15, 2003

(54) BI-STATE HYDRAULIC MOUNT WITH ANNULAR DECOUPLER

(75) Inventors: Jay M. Shores, Miamisburg, OH (US); Sanjiv G. Tewani, Lebanon, OH (US); Richard E. Longhouse, Dayton, OH (US); Mark W. Long, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/777,205

(22) Filed: Feb. 5, 2001

(65) Prior Publication Data

US 2002/0105122 A1 Aug. 8, 2002

(51) Int. Cl.[7] .................................................. F16M 9/00
(52) U.S. Cl. ................................. 267/140.11; 267/140.3
(58) Field of Search ........................... 267/219, 140.14, 267/140.13, 140.3, 140.11, 140.15; 248/550, 636, 562

(56) References Cited

U.S. PATENT DOCUMENTS

| 4,721,292 A | * | 1/1988 | Saito | 267/140.13 |
| 4,773,634 A | * | 9/1988 | Hamaekers | 267/140.13 |
| 4,789,143 A | * | 12/1988 | Smith et al. | 267/140.14 |
| 4,796,874 A | * | 1/1989 | Hoying et al. | 267/140.14 |
| 4,869,477 A | * | 9/1989 | Hoying et al. | 267/140.14 |
| 4,901,986 A | * | 2/1990 | Smith | 267/140.14 |
| 5,516,084 A | * | 5/1996 | Rizzo | 267/140.13 |
| 5,645,138 A | * | 7/1997 | Tajima et al. | 267/140.13 |
| 6,036,183 A | | 3/2000 | Lee et al. | |
| 6,361,031 B1 | * | 3/2002 | Shores et al. | 267/140.14 |

* cited by examiner

Primary Examiner—Christopher P. Schwartz
Assistant Examiner—Melanie Torres
(74) Attorney, Agent, or Firm—Scott A. McBain

(57) ABSTRACT

A hydraulic mount useful for automotive vehicle powertrain applications includes an elastomeric body, a base, a flexible diaphragm and a partition assembled to provide a pumping chamber and a reservoir. An actuator is mounted for moving a closure member between positions to allow flow of fluid between the pumping chamber and the reservoir and to restrict flow of fluid between the pumping chamber and the reservoir. The partition comprises an orifice plate assembly including a valve housing and an annular recess formed in one of two orifice plates for receiving a decoupler. The orifice plates include openings therein for communicating fluid between the decoupler and the pumping chamber and between the decoupler and the reservoir, respectively.

10 Claims, 2 Drawing Sheets

BI-STATE HYDRAULIC MOUNT WITH ANNULAR DECOUPLER

FIELD OF THE INVENTION

The present invention pertains to a hydraulic mount assembly, particularly adapted for automotive vehicle applications, having a control valve to provide bi-state soft and firm performance characteristics and including an annular decoupler which further improves high frequency vibration isolation capability of the mount in the low rate or soft operating mode.

BACKGROUND

Conventional vehicle powertrain mounts exist in many varieties and generally operate to provide engine vibration isolation while also controlling engine motion with respect to the vehicle frame or body structure. It has been recognized as desirable to provide a mount that exhibits relatively high damping responses or high dynamic stiffness for isolating or reacting low frequency relatively high amplitude vibrations and relatively low damping responses for isolating high frequency relatively low amplitude vibrations. For example, for vehicle power train control, it is desirable for the mount to provide higher damping and dynamic stiffness for low frequency, high amplitude inputs. At the same time, for the purpose of noise isolation, it is desired that the mount provide low dynamic stiffness at high frequency, low amplitude inputs.

One preferred type of mount which provides the above-recognized desiderata achieves its operating characteristics by allowing relatively free fluid pumping within the mount so that the mount deflects relatively easily thus minimizing the transmission of forces from the suspended or supported mass. Such a mount is also operable to provide relatively hard or stiff operating characteristics for controlling motion through transient, high amplitude vibrations or motion inputs. This operating characteristic is achieved by interrupting fluid flow from within the mount so that deflection of the mount causes an increase in pressure and contributes to an increase in mount stiffness.

U.S. Pat. No. 6,036,183 issued Mar. 14, 2000 to Chiung Alex Lee et al. pertains to a hydraulic mount which includes a valve positioned at a partition between the working chamber of the mount and the fluid reservoir. The valve body and the partition together define a control chamber in the fluid path and the control chamber is open to the reservoir through lateral openings in the valve body so that fluid pressure in the control chamber does not impose substantial biasing forces on the valve body or closure member and a small actuator can move the valve. When the valve is closed the fluid path is closed between the working chamber and the reservoir of the mount, thus providing for firm operational characteristics in controlling large amplitude inputs, such as those experienced from engine torque transients, for example. The subject matter of U.S. Pat. No. 6,036,183 is hereby incorporated herein by reference.

Additionally, however, it is desirable to provide a mount which provides for isolation of relatively low amplitude high frequency vibrations in the low rate or low stiffness operating mode. However, such a mount should also have cost, packaging, weight and performance advantages over a bi-state mount of the type described above as well as other bi-state mounts previously known. It is to these ends that the present invention has been developed.

SUMMARY OF THE INVENTION

The present invention provides an improved hydraulic mount, particularly adapted for vehicle powertrain mount applications, that provides both a high dynamic rate or dynamic stiffness and a low dynamic rate, and a decoupler to improve high frequency vibration isolation characteristics of the mount.

In accordance with one aspect of the present invention, a hydraulic mount is provided which comprises an upper elastomer housing or body, a base member and an orifice plate interposed the housing and the base member. The orifice plate is preferably integrally formed with a valve body for a generally cylindrical, so-called spool type valve closure member which is movable relative to the valve body to allow relatively free flow between fluid filled chambers in a first position. In a second position the valve closure member substantially restricts flow between the fluid filled chambers of the mount to control the mount operating characteristics. The orifice plate is provided with an annular decoupler member mounted thereon and retained in engagement therewith by a separable disc-like retainer member. Plural orifices in the orifice plate and the separable disc retainer member open to an annular recess containing the decoupler member to allow limited fluid flow through the orifices to provide for damping high frequency, low amplitude vibrations, in particular.

The hydraulic mount of the present invention overcomes the problems associated with prior art mounts with orifices which are tuned to provide a low dynamic rate at frequencies typically associated with engine idle (i.e., frequencies of about 25 to 50 Hz, depending on the engine). Hydraulic mounts with orifices that are tuned to provide a low dynamic rate at the aforementioned frequencies will have a high rate at frequencies only slightly higher due to the nature of fluid resonance. This characteristic can cause poor high frequency isolation characteristics of the mount.

Although decouplers are used in certain hydraulic mounts to overcome the aforementioned problem, packaging limitations in prior art mounts, including bi-state mounts in particular, have not provided for the incorporation of a decoupler in the mount. However, by providing an annular decoupler in the configuration according to the present invention, a mount is provided which is operable as a remotely controllable mount which also includes a decoupler to improve high frequency vibration isolation and provides a mechanically uncomplicated and compact design for improved cost and packaging considerations.

Those skilled in the art will further appreciate the above-mentioned advantages and superior features of the invention together with other important aspects thereof upon reading the detailed description which follows in conjunction with the drawing.

DETAILED DESCRIPTION OF A PREFERRED EMBODIMENT

Figure 1:
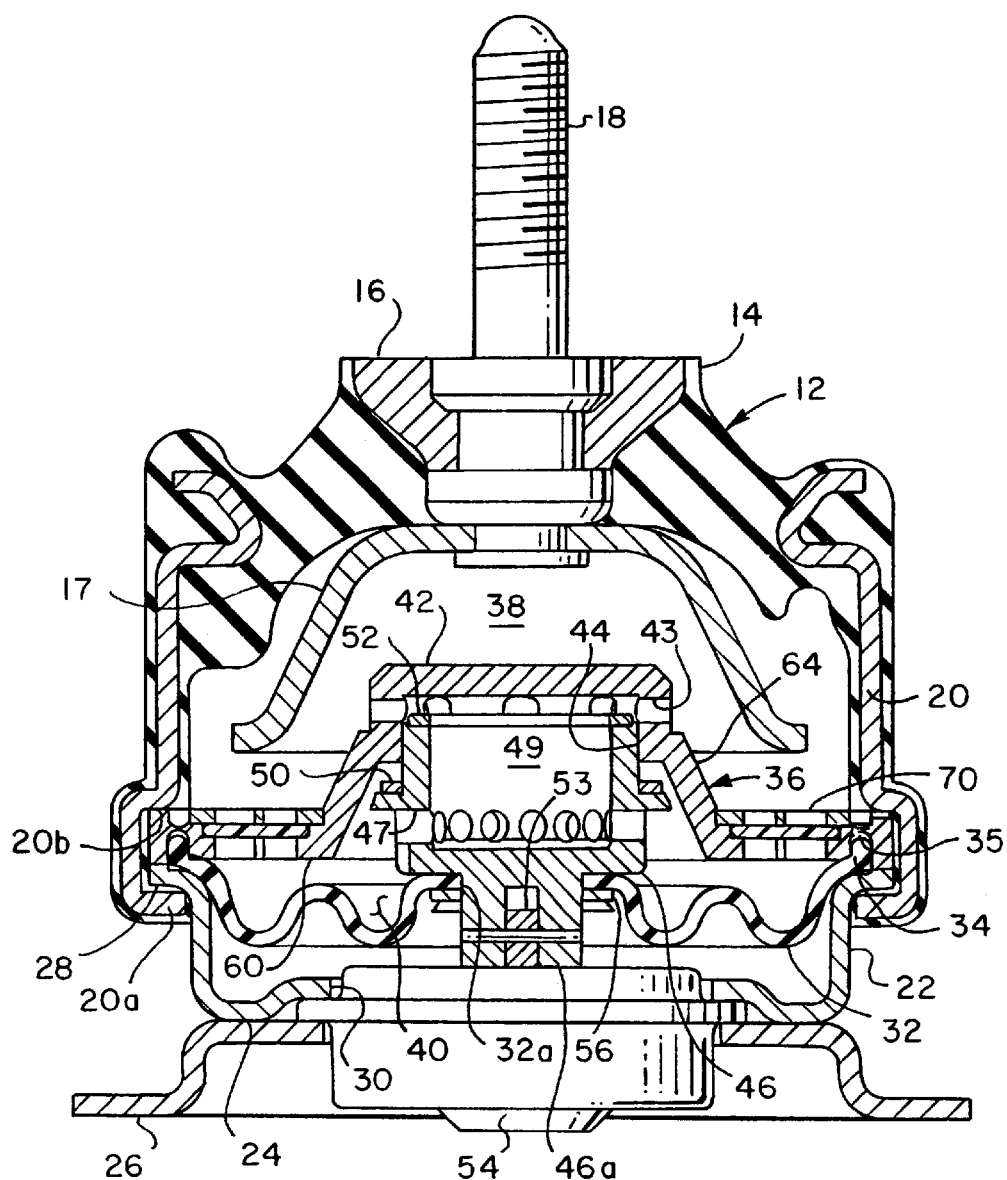
FIG. 1 is a longitudinal central section view of a preferred embodiment of a hydraulic mount in accordance with the present invention.

In the description which follows, like parts are marked throughout the specification and drawing with the same reference numerals, respectively. The drawing figures are not necessarily to scale in the interest of clarity and conciseness.

Referring to FIG. 1, there is illustrated an improved hydraulic powertrain mount particularly adapted for automotive vehicle applications, in accordance with the invention and generally designated by the numeral 10. The hydraulic mount 10 includes a generally cylindrical elastomer body 12 having a central hub portion 14 molded over a retainer member 16 for a mounting element comprising an elongated threaded post member 18. A somewhat bell shaped displacement limiting interlock member 17 is suitably secured to the mounting element 18, as shown. The molded elastomer body 12 is reinforced by an annular formed metal ring 20 embedded in the elastomer material. A generally cylindrical cup-shaped base member 22 comprises a bottom wall 24 suitably connected to a generally cylindrical ring-shaped mounting element 26 in a suitable manner. The base member 22 also includes a circumferential radially outwardly projecting flange 28 and a central axial opening 30 formed therein. A generally cylindrical flexible elastomer diaphragm member 32 is engageable at its peripheral rim 34 by the flange 28. The rim 34 is also disposed in a circumferential groove 35 of a combination orifice plate assembly and valve housing, generally designated by the numeral 36. The orifice plate assembly 36 is interposed an internal fluid pumping chamber 38 defined between the body 12 and the orifice plate assembly and a fluid reservoir 40 defined generally between the orifice plate assembly and the diaphragm 32.

The orifice plate assembly 36 includes a generally cylindrical upward projecting valve housing or tower part 42 having a central cylindrical bore 44 for receiving an axially movable spool-type valve closure member 46. Valve closure member 46 includes plural radially extending circumferentially spaced ports 47 formed therein and opening between the reservoir 40 and a spool chamber 49. Closure member 46 is open at its upper end for communicating pressure fluid between the chamber 49 and the pumping chamber 38 by way of circumferentially spaced radially projecting ports 43 formed in the valve housing or tower part 42. Suitable annular seal rings 50 and 52 are mounted on the closure member 46 and are operable to engage the valve housing part 42 to form a fluid tight seal when the closure member 46 is biased completely upwardly and closing off communication with the ports 43.

However, the spool type closure member 46 may be moved downwardly to the position shown in FIG. 1 to allow substantially unrestricted fluid flow between pumping chamber 38 and reservoir 40 through the ports 43, the chamber 49 and the ports 47. Closure member 46 includes a depending clevis part 46a projecting through a central opening 32a in diaphragm 32 and connected to an axially movable rod part 53 of a suitable valve actuator 54. Diaphragm 32 is sealingly engaged with closure member 46 by way of a retainer 56 connected to the closure member 46 at clevis part 46a.

Figure 2:
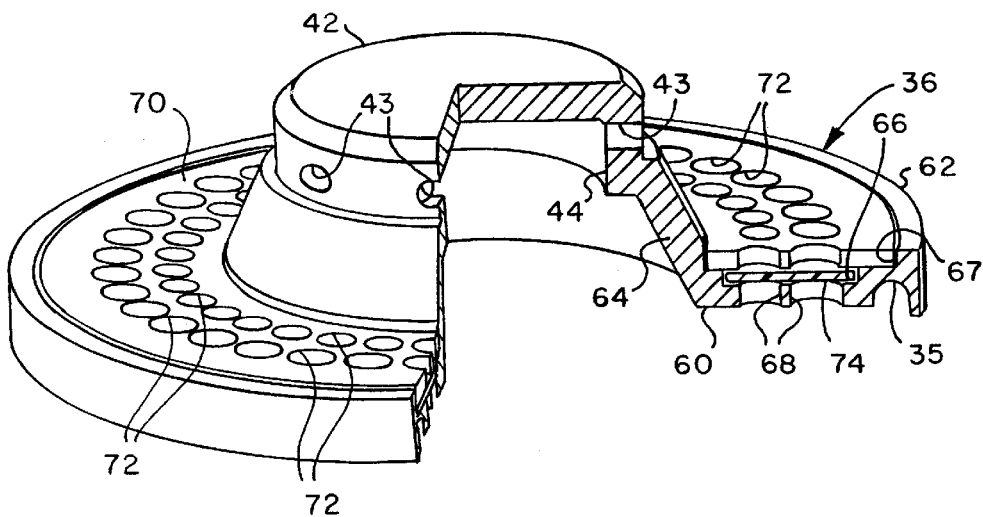
FIG. 2 is a perspective view, partially sectioned, of the orifice plate and valve housing for the mount of the present invention.

Referring now to FIG. 2, the orifice plate assembly 36 is shown in further detail. The orifice plate assembly 36 includes a lower orifice plate member 60 having an outer peripheral rim 62 and an inner frustoconical hub 64 which projects axially upwardly, viewing FIG. 2, and is integrally joined to the valve housing part 42. Lower orifice plate member 60 includes an annular recess 66 formed therein and plural pairs of generally cylindrical orifices circumferentially spaced about the lower orifice plate and opening into the recess 66.

The orifice plate assembly 36 includes a retainer comprising a separable annular upper orifice plate member 70 which is disposed in a second and larger diameter annular recess 67 formed in the lower orifice plate member 60, as illustrated. Upper orifice plate member 70 is a generally planar annular disc shaped member and is also provided with circumferentially spaced pairs of axially extending orifices 72 which open to the recess 66 formed in the orifice plate member 60. A generally planar, annular, elastomer decoupler member 74 is provided of dimensions such that it may lie loosely in the recess 66 when the orifice plate members 60 and 70 are assembled to each other.

Accordingly, the decoupler 74 may move slightly upwardly or downwardly in response to differential fluid pressures acting thereon from fluid flowing through the orifices 68 and 72. By incorporating a decoupler, such as the decoupler 74, together with the orifice plate members 60 and 70, the partition formed by the orifice plate assembly 36 interposed the pumping chamber 38 and the reservoir 40 serves a dual function and the overall configuration of the mount 10 may fit within the same dimensional envelope as the bi-state mount described and claimed in U.S. Pat. No. 6,036,183, for example.

Referring again to FIG. 1, the mount 10 is preferably assembled by inserting the rim 34 of the diaphragm 32 into the groove 35 in the lower orifice plate member 60 and by clamping the orifice plate members 60 and 70 and the base plate 22 together at the flanges 18 and the rim 62 by displacing the metal reinforcement member 20 radially inwardly to form a circumferential flange 20a and a shoulder 20b, FIG. 1, to tightly secure the elements of the mount 10 to each other, as shown. In fact, the orifice plate member 70 may be forcibly secured to the orifice plate member 60 by the aforementioned clamping of the orifice plate between the shoulder 20b and the radially inwardly turned flange 20a.

Figure 3:
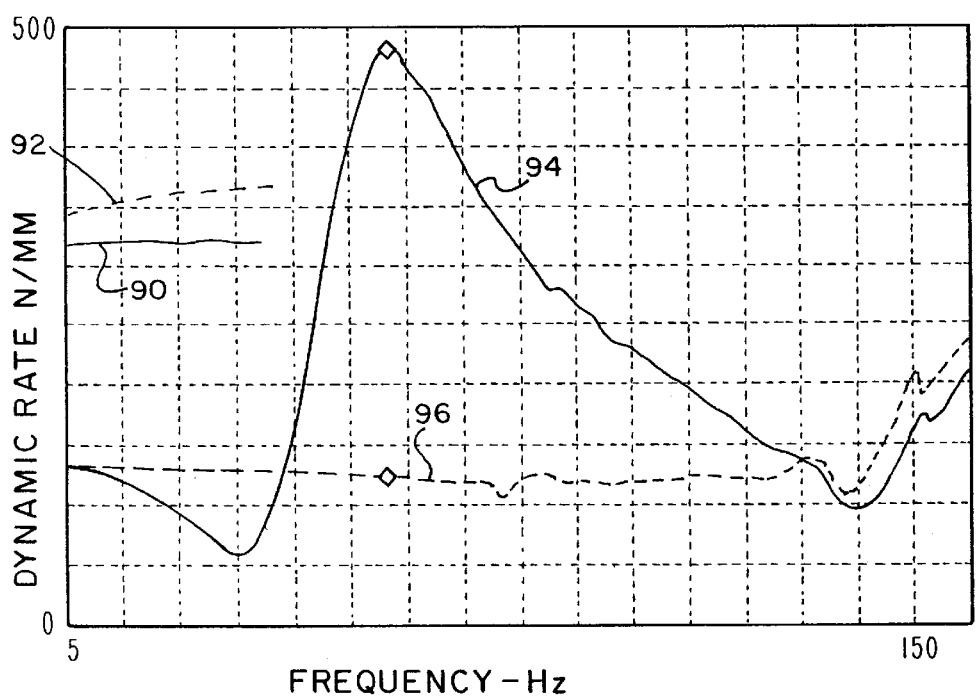
FIG. 3 is a schematic diagram illustrating dynamic rate versus frequency for the mount of the invention compared with a similar mount without a decoupler.

FIG. 3 illustrates the improved performance characteristics of the mount 10 as compared to a similar mount without the decoupler 74. For high dynamic rate displacements imposed on the mount 10, that is, with the valve closure member 46 blocking the ports 43, the difference between the mount 10 with the decoupler feature is illustrated by the curve 90 for vibration frequencies between about 5 Hz and 30 Hz, as compared with the dynamic rate of a mount without the decoupler feature indicated by the curve 92. However, in the low displacement modes, such as when damping vibrations at engine idle, and with the bi-state valve closure member 46 in the valve open position, the dynamic rate or stiffness of the non-decoupled mount is indicated by curve 94 showing a very high rate or stiffness in a frequency range of about 30 Hz to 70 Hz, while the mount 10 with the orifice plate assembly 36 and the decoupler 74 has a substantially constant dynamic rate or so-called dynamic stiffness as indicated by curve 96 for vibrations input to the mount in a frequency range from 5 Hz to as high as about 140 Hz. Accordingly, the damping characteristics of the mount 10 for low displacement high frequency vibrations is superior to the same type of mount without the decoupler 74 and the configuration of the orifice plate assembly 36.

The construction and operation of the mount 10 is believed to be readily understandable to those of ordinary skill in the art from the foregoing description. Conventional engineering materials and construction methods may be used to manufacture the mount 10. Although a preferred embodiment of the invention has been described in detail herein, those skilled in the art will also recognize that various modifications and substitutions may be made to the embodiment disclosed without departing from the scope and spirit of the appended claims.

What is claimed is:

1. A hydraulic mount comprising:

first and second mounting elements;

an elastomeric body connected to one of said mounting elements;

a base plate connected to the other of said mounting elements and operably connected to said elastomeric body;

a partition interposed between said elastomeric body and said base plate;

a flexible member interposed between said partition and said base plate whereby a reservoir chamber is formed between said flexible member and said partition and a pumping chamber is formed between said elastomeric body and said partition;

a valve body and a valve closure member associated with said valve body and movable between a first position to allow relatively free flow of fluid between said chambers and a second position to substantially restrict fluid flow between said chambers, wherein said valve body forms part of said partition;

a displacement limiting interlock member connected to one of said mounting elements; and a decoupler operable to isolate vibrations imposed on said mount, wherein:
  said decoupler is supported on said partition, and
  said decoupler includes an annular member movable within a recess in said partition and in communication with one of said chambers through a plurality of orifices formed in said partition.

2. The mount set forth in claim 1 wherein:

said partition is formed by a lower orifice plate member and an upper orifice plate member, said orifice plate members being operable to be disposed in assembly with each other with said decoupler disposed therebetween.

3. The mount set forth in claim 2 wherein:

said orifice plate members each include a plurality of orifices opening to said decoupler and to said reservoir chamber and said pumping chamber, respectively.

4. The mount set forth in claim 2 wherein:

one of said orifice plate members includes said valve body formed on a central portion of said one orifice plate member.

5. A hydraulic mount comprising:

first and second mounting elements;

an elastomeric body connected to one of said mounting elements;

a base plate connected to the other of said mounting elements and operably connected to said elastomeric body;

a partition interposed between said elastomeric body and said base plate;

a fluid reservoir chamber formed between said base plate and said partition and a fluid pumping chamber formed between said elastomeric body and said partition;

a valve body and a valve closure member associated with said valve body and movable between a first position to allow relatively free flow of fluid between said chambers and a second position to substantially restrict fluid flow between said chambers; and a decoupler operable to isolate vibrations imposed on said mount comprising an annular member movable within a recess in said partition and in communication with one of said chambers through one or more orifices formed in said partition.

6. The mount set forth in claim 5 wherein:

said partition is formed by separable orifice plate members operable to be disposed in assembly with each other with said decoupler disposed therebetween.

7. The mount set forth in claim 6 wherein:

one of said orifice plate members includes said valve body formed on a central portion of said one orifice plate member.

8. A hydraulic mount comprising:

an elastomeric body;

a base plate;

a partition interposed between said elastomeric body and said base plate;

a fluid reservoir chamber formed between said base plate and said partition and a fluid pumping chamber formed between said elastomeric body and said partition;

a valve body connected to said partition;

a valve closure member associated with said valve body and movable between a first position to allow relatively free flow of fluid between said chambers and a second position to substantially restrict fluid flow between said chambers;

an actuator connected to said closure member for moving said closure member between said first and second positions; and an annular decoupler supported on said partition and operable to isolate vibrations imposed on said mount.

9. The mount set forth in claim 8 wherein:

said partition is formed by a lower orifice plate member and an upper orifice plate member, said orifice plate members being operable to be disposed in assembly with each other with said decoupler disposed therebetween.

10. The mount set forth in claim 9 wherein:

said orifice plate members each include a plurality of orifices opening to said decoupler and to said reservoir chamber and said pumping chamber, respectively.

* * * * *